July 16, 1963
G. H. ALLEN
3,097,855
SEALING ARRANGEMENT
Filed June 26, 1959
3 Sheets—Sheet 1
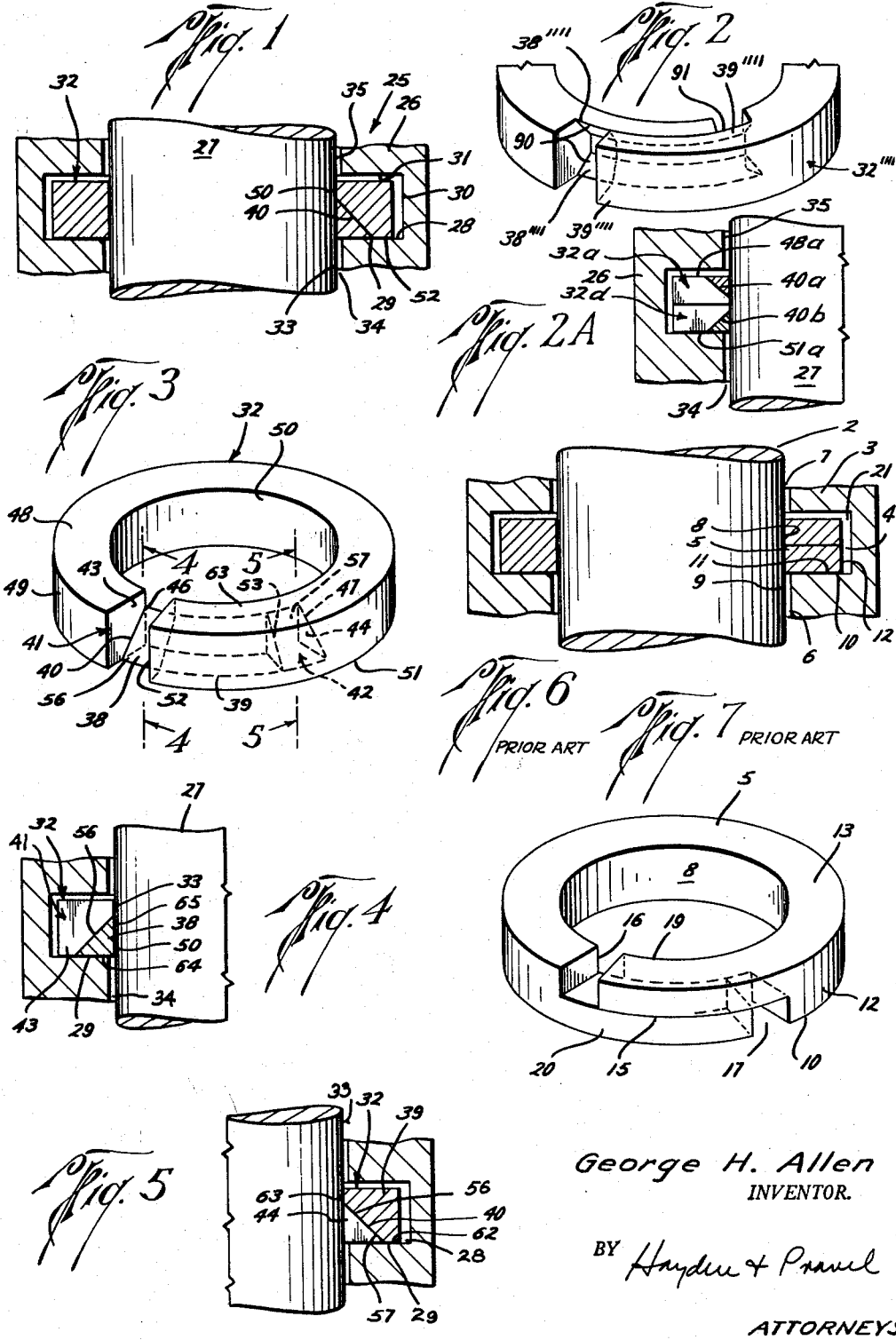
George H. Allen
INVENTOR.
BY Hayden & Prawl
ATTORNEYS

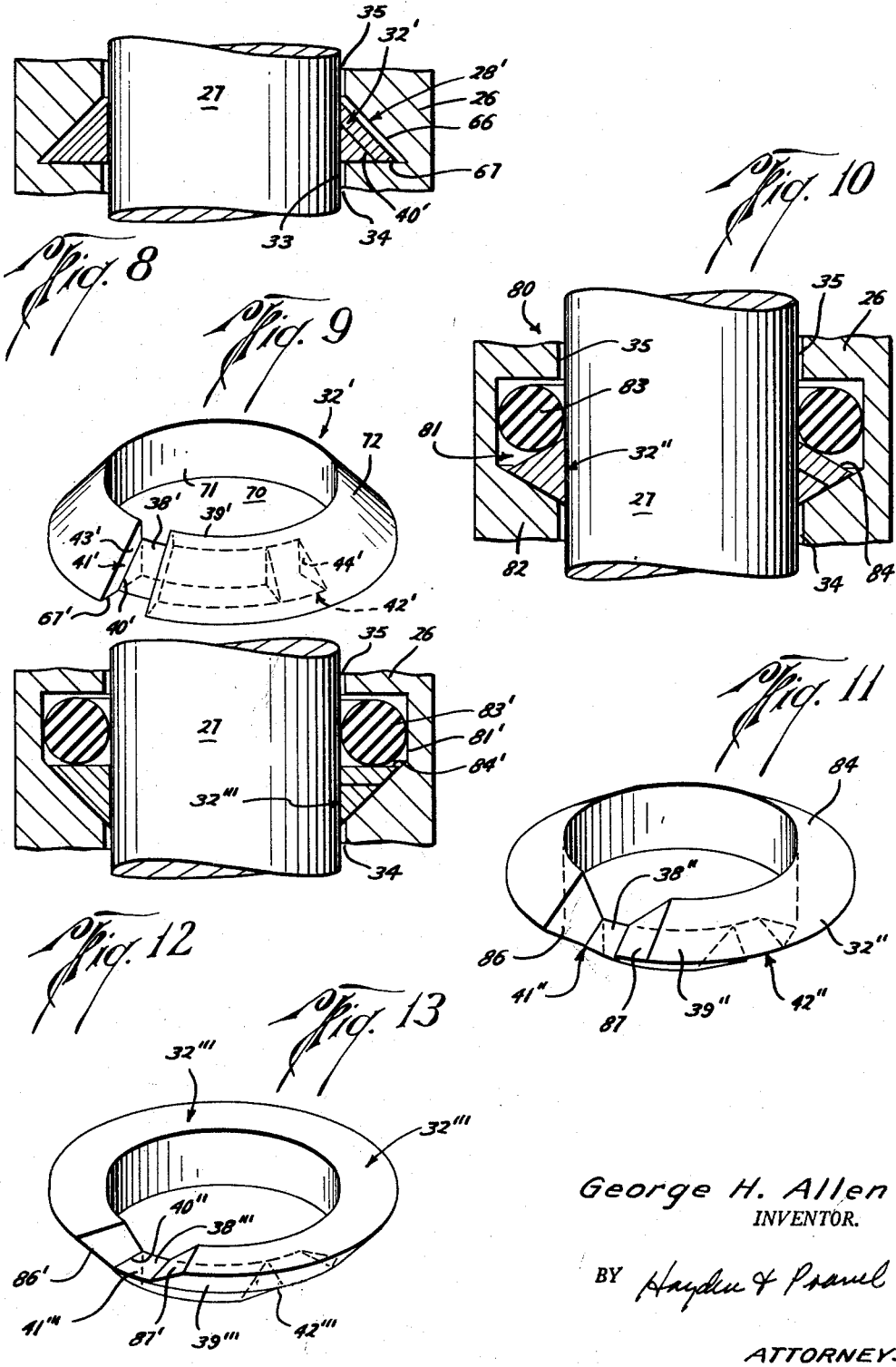

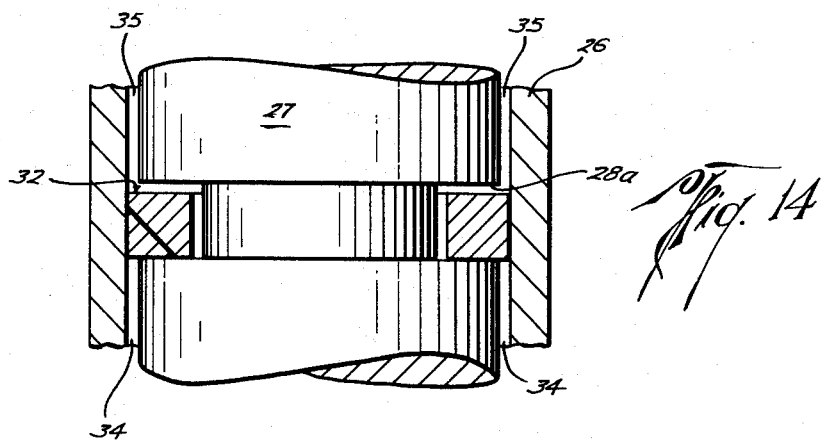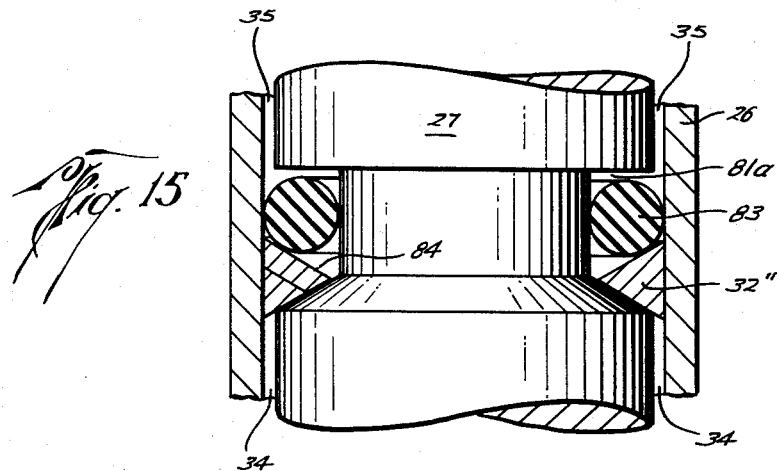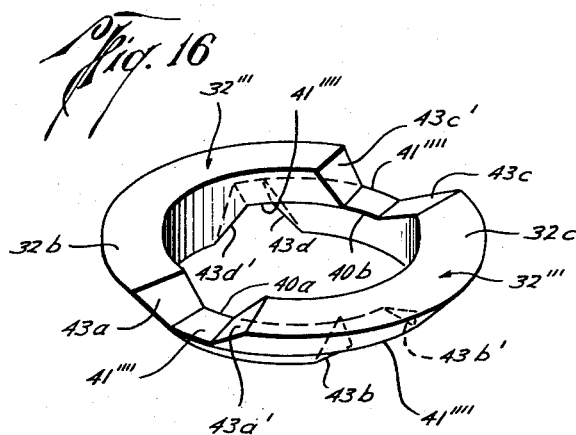

() # United States Patent Office 3,097,855
Patented July 16, 1963

3,097,855
SEALING ARRANGEMENT
George H. Allen, La Porte, Tex.
Filed June 26, 1959, Ser. No. 823,255
5 Claims. (Cl. 277—188)

The present invention relates to a sealing arrangement for sealing off between members.

In sealing arrangements used at the present time wherein a split ring is employed, it is impossible to effectively seal off from one side of the ring to the other so that when the ring is employed to endeavor to seal off between members, leakage of fluid occurs from one side of the ring to the other. In some instances it is extremely disadvantageous to employ a ring of this type, because it is desirable, or necessary to effectively seal off between members; however, on the other hand, the structural arrangement of the seal, and the relative relationship of the members in which the seal is to be employed, may necessitate that a split sealing ring arrangement be employed. Therefore, under such circumstances it has heretofore been impossible to provide a split ring which positively seals between members and prevents leakage from one side of the seal ring to the other.

The present invention overcomes this problem in that it provides a sealing ring arrangement which effectively seals off between members.

Still another object of the present invention is to provide a sealing ring which is split circumferentially so that it may be employed in any situation where it is desired or necessary to employ a split seal ring, but which split ring is constructed and arranged so that it engages between the members so as to effectively seal off and prevent leakage from one side of the seal ring to the other.

Still another object of the present invention is to provide a back-up ring which may be employed in a sealing arrangement so as to inhibit extrusion of a resilient sealing ring employed with, or resting on the back-up ring.

Still a further object of the present invention is to provide a split sealing ring of the particular configuration so that it has portions which engage between members so as to effectively prevent leakage from one side of the seal ring to the other.

Still another object of the present invention is to provide a ring which may be of any desirable configuration to fit in any suitable shape groove, which ring is constructed and arranged so that it seals when positioned in a groove, and which ring also functions as a back-up for an annular resilient sealing member such as an O-ring.

Other objects and advantages of the present invention will become more readily apparent from consideration of the following description and drawings wherein:

FIG. 1 is a sectional view illustrating the sealing arrangement of the present invention partially in elevation, and showing a form of the seal ring of the present invention and its relationship to the members it seals between;

FIG. 2 illustrates a partial view of the ring and shows a modified form of the split ring;

FIG. 2A is a modified form of the ring illustrated in FIG. 2 and illustrates the FIG. 2 modification being formed by two separate rings instead of an integral ring;

FIG. 3 is a perspective view of the seal ring illustrated in the FIG. 1 sealing arrangement;

FIG. 4 is a sectional view on the line 4—4 of FIG. 3 to more clearly illustrate the manner in which the sealing ring is split;

FIG. 5 is a vertical sectional view of the line 5—5 of FIG. 3 and also illustrates the details of construction of the split ring;

FIG. 6 is a view illustrating a split seal ring heretofore commonly used;

FIG. 7 is a perspective view of the seal ring heretofore used;

FIG. 8 is a view somewhat similar to FIG. 1 showing the sealing arrangement of the present invention and a modified form of the sealing ring used in the present invention;

FIG. 9 is a perspective view showing in more detail the sealing ring of FIG. 8;

FIG. 10 is an alternate embodiment of the present invention showing the sealing ring in sectional view and acting as a back-up ring for the resilient sealing member resting thereon;

FIG. 11 is a perspective view illustrating in greater detail the ring of the present invention shown in FIG. 10;

FIG. 12 is a view somewhat similar to FIGS. 1 and 8 and showing still another modification of the sealing ring of the present invention;

FIG. 13 is an isometric view of the sealing ring shown in FIG. 12.

FIG. 14 is a view similar to FIG. 1, but illustrates the sealing ring seated in the other member;

FIG. 15 is a view similar to FIG. 10, but illustrates the sealing ring seated in the other member; and FIG. 16 is an isometric view of still another form of the sealing ring of the present invention.

Attention is directed to FIG. 6 of the drawings wherein one member is illustrated at 2 and a second member is illustrated at 3. For purposes of illustration the member 3 may be referred to as a cylinder member and the member 2 may be referred to as a piston member, it being desirable to move the members 2 and 3 relative to each other. It will be noted that a groove 4 is provided in the member 3, and that a ring 5 is positioned in the groove; the ring 5 is illustrated in perspective view in FIG. 7 and is of the form heretofore used. As illustrated in FIG. 6, the ring 5 may be seated in the groove 4 and is adapted to inhibit leakage from one side of the seal ring to the other between the members 2 and 3. However, the construction of the ring 5 is such that it can never inhibit or prevent leakage of fluid from one side of the ring to the other, so that under any circumstances fluid may flow in the annular space 6 on one side of the seal ring to the annular space 7 between the members 2 and 3 on the other side of the seal ring as noted in FIG. 6, or fluid may flow from space 7 to space 6.

It will be noted that the seal ring 5 is illustrated in FIG. 6 as being of rectangular configuration and is provided with one surface 8 which abuts the surface 9 on the member 2 and is provided with a surface 10 which seats on the bottom 11 of the groove 4 and is also provided with a rear surface 12 and a top surface 13. The ring 5 is split as shown in FIG. 7 by reason of the circumferential slit 15 which is illustrated as being about half way between the bottom surface 10 and the top surface 13 of the ring 5. A radial slit extends from each end of the slit 15 to opposite surfaces of the ring. When the ring is seated between the members 2 and 3, a radial groove 16 is formed at one end of the slit 15 and a radial groove 17 is formed at the other end of the circumferentially extending slit 15, thereby providing overhanging or overlapping portions 19 and 20. This enables the seal ring 5 to be positioned in the groove 4 and about the member 2.

In actual operation, fluid may pass up through the space 6 and into the groove 17 whereupon it flows into the groove to the space 21 as illustrated in FIG. 6 whereupon it may then pass through groove 16 to the annular space 7 between the members 2 and 3 above the seal ring 5. Also fluid may flow from space 7 through groove 16 to the space 21, whereupon fluid may then gain access to space 6 by flowing through groove 17. It can therefore be seen that under no circumstances is a seal provided by this construction.

Attention is now directed to FIG. 1 of the drawings wherein the present invention is illustrated generally by the numeral 25. It would be noted that one member 26 is adapted to receive the member 27, it being contemplated that relative movement may occur between the members 26 and 27 as desired. A groove 28 is arranged in the member 26, such groove being illustrated in FIG. 1 modification as being rectangular in configuration and having a bottom surface 29 and annular end surface 30 and a top surface 31. A rectangular seal ring illustrated generally at 32 is provided which seats in the groove 28 and is provided with a surface which contacts the outer periphery 33 of the member 27 and a surface of the groove 28 so as to form a seal inhibiting leakage from the annular space 35 between the members 26 and 27 above the ring 32 to the annular space 34 between the members 26 and 27 below the seal ring 32.

In order to accomplish this, the seal ring 32 is split in a particular manner, and attention is directed to FIG. 3 where it will be noted that the seal ring 32 is provided with two portions 38 and 39 which overlie or overlap each other and contact each other circumferentially of the annular seal ring 32. The overlapping or overlying portions 38 and 39 are defined by a circumferential slit 40 and the grooves generally designated 41 and 42 which extend in opposite directions from the circumferentially extending slit 40 and at each end thereof.

It will be noted that the grooves 41 and 42 are defined by the circumferential slit 40, the radial slits 43 and 44 which extend from each end 46 and 47 of the slit 40 and in opposite directions relative to each other and the ends 52 and 53 of the projections 39 and 38, respectively. The slit 43 as illustrated in FIG. 3 communicates with the surface 48 and the surface 49 and part of surface 50, and a part of surface 51 of the seal ring 32; the slot 42 communicates with part of the surface 50 and part of the bottom surface 51 of the seal ring 32.

The seal rings 32 may be seated in either the member 26, or the member 27. For purposes of illustration in FIGS. 1–13, they are shown in the drawings as being seated in the member 26, but it is to be understood that they can also be seated in the member 27 as shown in FIGS. 14 and 15.

At any event, the rings are normally constructed so that when seated in one member they are urged into contact with the other member adjacent thereto.

It will be further noted that the circumferential slit 40 extends from the surface 50 of the seal ring 32 which is adapted to abut against the outer surface 33 of the member 27 to the bottom surface 51 of the ring 32 which rests on the bottom 29 of the groove 28 as shown in FIGS. 1, 3 and 4 of the drawings.

Thus, when fluid pressure attempts to pass around the ring 32 in groove 28 it is inhibited from doing so by reason of the fact that the seal ring and its portions or projections 38 and 39 continuously contact the member 27 and the bottom 29 of the groove 28 in member 26 so as to inhibit passage of fluid through the groove 28 or between the seal ring 32 and member 27, and also by reason of the fact that the members, or circumferentially extending overlapping members, portions or projections 38 and 39 engage along their surfaces 56 and 57 respectively formed by the circumferentially extending slit 40 which extends at an angle from the surface 50 to the bottom surface 51 of the ring 32.

To further amplify and describe, it will be assumed that pressure fluid in the annular space 35 endeavors to pass around the seal ring 32 to the annular space 34 about the ring 32 or endeavors to pass directly into the space 34 by flowing between the seal ring 32 and member 27. In this event the fluid will pass from the space 35 into the groove 28 and then into the groove 41 of the seal ring and may pass to the rear surface 30 of the groove 28 in the member 26. FIGS. 1, 4 and 5 illustrate the relationship of the seal ring 32 and groove 28 when pressure is applied in space 35 above the ring. However, as best seen in FIG. 4, fluid cannot escape from groove 41 of the seal ring 32 into the space 34 below the seal ring 32 since the portion 64 on the circumferentially extending portion 38 rests on the bottom 29 of the groove 28 and thereby seals with the groove bottom 29 and inhibits the passage of fluid along the bottom of the groove. Similarly, the portion 65 of surface 50 on the circumferentially extending portion 38 engages against the periphery 33 of the member 27 and prevents the fluid from passing downwardly around the member 27 along the surface 50.

The fluid pressure from space 35 and in groove 28 cannot gain access to groove 42 since the portion 62 on projection 39 of the seal ring 32 seals with the bottom 29 of the groove 28 as shown more clearly in FIG. 5. The fluid pressure may not pass from space 35 along the surface 50 of member 27 to the space 34 below the seal ring 32 because the portion 63 of surface 50 on the projection 39 engages and seals against the periphery 33 of the member 27.

The fluid cannot pass along the slit 40 since the surfaces 56 and 57 of the portions 38 and 39 respectively contact each other.

Thus it can be appreciated that the passage of fluid from the pressure side or from one side to the other of the seal ring is prevented.

FIG. 8 illustrates an alternate embodiment of the present invention wherein the configuration of the groove is designated generally at 28'. The groove 28' is of a triangular configuration and includes the sloping annular side 66 and the bottom 67 which is substantially horizontal. The ring is illustrated by the numeral 32' and is shown in greater detail in FIG. 9. It will be noted that the ring 32' is of the same general configuration of the groove 28' in that it has a bottom 67' which is adapted to rest on the bottom 67 of the groove and it is provided with a circular opening 70 which defines the annular surface 71 adapted to engage the periphery 33 of the member 27. The outer surface 72 of the ring 32' slopes so that a cross section of the ring 32' is in the form of a triangle. It will be noted that the ring 32' includes the circumferentially extending slit 40' to define the portions 38' and 39' which are similar in their relationship to each other as are the circumferentially extending portions 38 and 39 of the FIG. 3 modification, but the circumferentially extending portions 38' and 39' of FIG. 9 assume a different configuration, since the general shape of the ring has been changed.

Grooves 41' and 42' are formed at each end of the slit 40' by reason of the radially extending slits or cuts 43' and 44'. As previously noted with regard to the grooves 41 and 42 in the FIG. 3 modification, the grooves 41' and 42' in the FIG. 9 modification would generally be formed by reason of the fact that the opening 70 in the ring 32' is of a smaller diameter than the member 27 which it is adapted to seal about, so that when the ring is engaged in the groove 28' and the member 27 positioned in the member 26 as illustrated in FIG. 8, the ring will expand thereby spacing the ends of 38' and 39' from 43' and 44' to form the grooves 41' and 42'.

Leakage of fluid from the annular space 35 in FIG. 8 to the annular space 34 is prevented in a manner by the ring 32' similar to the manner in which the ring 32 of the FIG. 3 modification prevents the flow of pressure fluid. For example, any pressure fluid that is attempting to pass from the space 35 to the space 34 cannot pass through the groove 41' since a portion of the circumferential projection 38' contacts the periphery 33 of the member 27 to inhibit leakage of fluid therealong and from the groove 28' in a manner as described with regard to FIGS. 1, 4 and 5. Also a portion of the circumferentially extending projection 39' engages the bottom of the groove 28' and the periphery 33 of the member 27 to prevent the flow of pressure fluid from space 35 to space 34 as previously described in detail with regard to FIG. 5.

The present invention also has application in use as a back-up ring for sealing members such as O-rings and other types of resilient seals. In some circumstances a great deal of difficulty is encountered with extrusion of a seal between two members due to the configuration of the groove, or the arrangement of the members relative to each other.

As illustrated in FIG. 10, the present invention includes a sealing arrangement designated generally by the numeral 80. In the form of the invention illustrated in FIG. 10 a groove 81 is provided in the member 82 and a sealing ring 32″ is adapted to be positioned in the groove 81. A resilient sealing member such as an O-ring is illustrated at 83 as resting on the sealing ring 32″, the sealing ring 32″ acting as a back-up ring to inhibit the extrusion or cold flow of the packing member 83. In the illustration shown in FIG. 10 when pressure flows from the annular passage 35 to the sealing ring 83, the sealing ring 32″ will be deformed and the object of the invention as illustrated in FIG. 10 is to present a surface area to the sealing ring of a suitable configuration to inhibit damage or extrusion of the sealing ring in a manner which might rupture the sealing ring or prevent proper sealing thereof.

The construction of the ring 32″ is illustrated in greater detail in FIG. 11 and is shown as comprising a triangular arranged member and particular attention is directed to the grooves 41″ and 42″ respectively. The groove 41″ is formed in a manner so that when pressure forces the sealing member 83 downwardly on the surface 84 rupture or damage to the sealing ring 83 is inhibited when it is deformed into the groove 41″. The groove 41″ may be provided with the sloping sides 86 and 87 on the portion of the sealing ring 32″ from which the projection 38″ extends and on the end of the circumferentially extending projection 39″, respectively. Thus when pressure is applied so that the ring 83 seats against the surface 84, the groove 41″ is in effect enlarged and does not present any sharp corners or edges to the ring which might otherwise tend to rupture or cut the ring, particularly if a groove as illustrated by 41 of FIG. 3, or 41′ in FIG. 9 were used.

In FIGS. 10 and 11 a seal from the space 35 to the space 34 is also obtained by the ring 32″. Pressure fluid cannot pass around the ring 32″, from pressure side 35 to space 34 below the ring 32″ as there is some portion of the ring 32″ in contact with the member 27 and also with the groove 81 in the member 26 at all times so that pressure fluid may not flow around the sealing ring 32″ from the annular space 35 to the annular space 34.

In FIG. 12 the member 27 is again illustrated as is the member 26. The groove 81′ is similar in configuration to the groove 81, and an alternate form of seal ring 32‴ is illustrated for fitting in the groove 81′ and providing a back-up surface 84′ on which the seal ring 83′ may rest. Attention is again directed to the groove 41‴ and the groove 42‴ wherein it will be noted that the grooves 41‴ and 42‴ define surfaces having substantially no sharp corners or portions in which the rubber ring 83′ could be extruded or would be extruded which might tend to rupture it or otherwise damage it under pressure. The seal ring 32‴ in the FIGS. 12 and 13 modification forms a seal between the space 35 and 34 on each side of the ring 32‴ in a manner as previously described with regard to the other modifications of the invention. It will be noted that in the FIGS. 12 and 13 modification, the ring 32‴ is shaped so that the seal ring or O-ring 83′ is supported in a substantially rectangular shaped groove and on a substantially horizontally disposed surface 84′ of the ring 32‴.

The groove 41‴ is formed by reason of the slit 40″ which extends circumferentially and by reason of the surfaces 86′ and 87′. The surface 86′ slopes in a direction opposite to the surface 87′ and is on the portion of the ring from which the circumferential projection 38‴ extends. The surface 87′ slopes in an opposite direction relative to the direction of slope of the surface 86′, and is formed on the end of the member 39‴ which extends circumferentially and overlaps and contacts the circumferentially extending portion 38‴.

It can be appreciated that while the groove 28 or 81 has been illustrated as being in the member which surrounds the member 27, the groove could as easily be positioned in the member 27 with the seal ring therein and engaging the adjacent wall of the member 26.

It should be noted that in the FIG. 2 modification an arrangement is provided wherein the configuration of the circumferentially extending portions is changed somewhat. The seal ring of FIG. 2 is adapted to be used to seal off between members also, and is constructed so that it will seal off any flow of fluid either from space 35 to space 34 or from space 34 to space 35. Attention is directed to the circumferentially extending portions 38″″ and the circumferentially extending portion 39″″ which overlie and engage each other along their surfaces designated generally at 90 and 91, respectively, and function to seal off pressure on either side of ring 32″″. The paired circumferentially extending portions 38″″ which overlie and engage the circumferentially extending portion 39″″ of the seal ring 32″″ function in a manner as do the portions 38 and 39 of the FIG. 3 modification to seal off between two members, except that a seal is provided from space 35 to space 34 and from space 34 to space 35. The provision of the double projections 38″″ and their relationship to projection 39″″ and to the members 26 and 27 accomplish the function of sealing off between members 26 and 27 in either direction. It can be appreciated that fluid pressure cannot flow from above the ring to below the ring because the lower most projection 38″″ and the projection 39″″ cooperate to inhibit leakage. Also, when pressure flows against the bottom or ring 32″″ the uppermost projection 38″″ and projection 39″″ cooperate to inhibit leakage.

Under some circumstances a double seal ring may be provided and this is illustrated in FIG. 2A wherein the seal rings are generally designated by the numerals 32a and 32d. Each will be provided with a slit 40a and 40b, respectively, each of which extends circumferentially and from the surface adjacent the member 27 to the bottom surface 51a of the ring 32d and toward the top 48a of the ring 32a as shown in FIG. 2A of the drawings. The function of the FIG. 2A modification is the same as described with regard to the FIG. 2 modification, in inhibiting the flow of fluid from the space 35 between the members 26 and 27 to the space 34, or from the space 34 to the space 35.

In FIG. 14, the members 26 and 27 are shown, and the member 27 is provided with a groove 28a in which the sealing ring 32 is seated. The sealing ring 32 is constructed in a manner as previously described. FIG. 14 illustrates the invention where the groove is in the member 27 instead of member 26.

The seal ring 32 in this instance also seals off from space 35 to the space 34 above and below the ring 32, respectively.

In FIG. 15, the members 26 and 27 are shown with a groove 81a in member 27 of similar cross-sectional configuration to groove 81 in member 26 of FIG. 10. The seal ring 32″ in FIG. 15, and the O-ring 83 seal off from space 35 to space 34, and the surface 84 of the seal ring provides a seating surface for the ring 83.

In FIG. 16, a perspective view of a seal ring 32‴ is shown wherein the ring is formed of sections 32b and 32c. The sections are formed by the circumferential slits 40a and 40b and the laterally or radial extending slits 43a, 43a′, 43b, 43b′, 43c, 43c′, 43d and 43d′. Each circumferential slit is provided with paired radial slits at each end thereof which define grooves 41″″ in the seal ring 32‴. The sections 32b and 32c each are thereby provided with surfaces which seal off with each other, and with the members 26 and 27 at all times. While only two sections are illustrated, any suitable num-

What is claimed is:

1. A sealing arrangement for sealing between one member and another member including, a combination seal and back-up ring for positioning in an annular groove of said one member to seal with said other member, said seal and back-up ring having a configuration to provide a surface for seating on one surface of said groove and a surface for seating against said other member, said seal and back-up ring having a circumferential slit which extends from said ring surface seating in said groove to said ring surface seating against said other member, and said circumferential slit forming circumferentially extending portions which seal on surfaces defined by said circumferential slit, and said portions sealing against said groove surface and said surface on said other member, and an annular sealing member positioned in said groove and resting on said back-up ring.

2. The combination recited in claim 1 wherein a radial groove extends to said circumferential slit from each side of said ring, said radial groove in said seal and back-up ring having opposed sloping surfaces to inhibit rupturing said sealing member under pressure.

3. A sealing arrangement including
(a) paired members positioned together for relative movement therebetween,
(b) means to seal between said members,
(c) said means including an annular groove in one of said members,
(d) a seal ring for seating in said groove and abutting the other of said members,
(e) said seal ring having a split extending partially circumferentially thereabout to define circumferential projections which overlie and contact each other,
(f) said circumferential split extending from the edge of said ring which abuts said other member to the edge of said ring seating in said groove whereby said contacting projections engage said members and seal therebetween,
(g) and said seal means including a seal ring of resilient material in said groove.

4. A sealing arrangement including
(a) paired members positioned together for relative movement therebetween,
(b) means to seal between said members,
(c) said means including an annular groove in one of said members,
(d) a seal ring for seating in said groove and abutting the other of said members,
(e) said seal ring having a split extending partially circumferentially thereabout to define circumferential projections which overlie and contact each other,
(f) said circumferential split extending from the edge of said ring which abuts said other member to the edge of said ring seating in said groove whereby said contacting projections engage said members and seal therebetween,
(h) and said seal means including a second seal ring in said groove and having a circumferential split extending from the edge of said second seal ring, which abuts said other member to the edge of said second ring seating in said groove to define overlying and contacting projections to seal between said members.

5. A seal ring for sealing between members,
(a) said seal ring having a surface to seat in a groove in one of the members,
(b) said seal ring having a surface to seat against the other of said members,
(c) said seal ring having a split extending circumferentially and a radial slit at each end of said circumferential split,
(d) said radial slits extending in opposite directions from each other,
(f) said circumferential split extending from said surface abutting the groove in the one member to said surface abutting the other member,
(g) and said seal ring having a surface for supporting an annular seal member thereon.

References Cited in the file of this patent
UNITED STATES PATENTS

| | | |
|---|---|---|
| 615,902 | Raworth | Dec. 13, 1898 |
| 1,681,770 | Kautzky | Aug. 21, 1928 |
| 2,391,159 | Hermansen | Dec. 18, 1945 |
| 2,739,855 | Bruning | Mar. 27, 1956 |
| 2,797,945 | Monahan | July 2, 1957 |
| 2,860,019 | Osmun | Nov. 11, 1958 |